Jan. 26, 1960
L. SCHMID
2,922,316
STEERING COLUMN FOR MOTOR VEHICLES
Filed Nov. 5, 1956
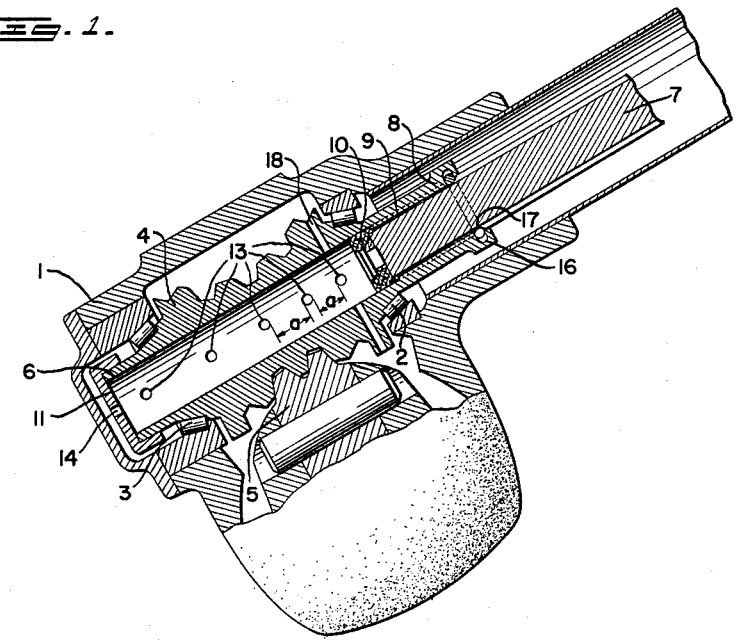
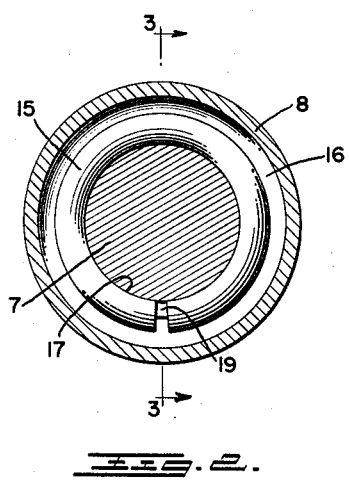
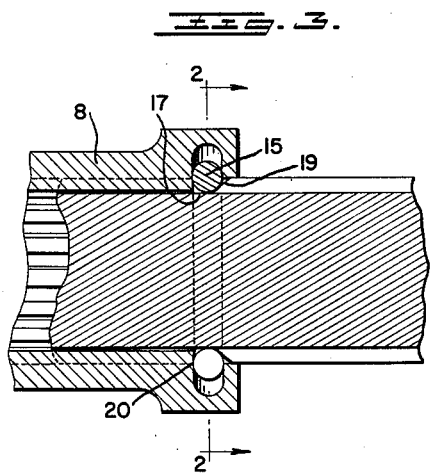
INVENTOR
LEOPOLD SCHMID
BY *Dicke and Craig.*
ATTORNEYS

United States Patent Office 2,922,316
Patented Jan. 26, 1960

2,922,316

STEERING COLUMN FOR MOTOR VEHICLES

Leopold Schmid, Stuttgart, Germany, assignor to Firma Dr. Ing. h. c. F. Porsche K. G., Stuttgart-Zuffenhausen, Germany Application November 5, 1956, Serial No. 620,418

Claims priority, application Germany July 20, 1956

2 Claims. (Cl. 74—493)

The present invention relates to a steering column for motor vehicles which is yieldable in the axial direction thereof and which is guided in a hollow worm gear while the steering column simultaneously forms the displacement or recuperator piston for the hydraulic damping medium in accordance with the present invention.

In constructions of this type, the space in the worm gear which accommodates the hydraulic damping medium is closed up by an insert member which is provided with a central aperture for the discharge or escape of the damping medium. With the occurrence of sudden loads on the damping medium by the steering column, as is the case, for example, during collisions, pressure waves are produced which as reflected or backward waves not only form a considerable resistance for the displacement or recuperator piston of the steering column but simultaneously therewith decrease the escape or discharge of the damping medium through the throttle aperture whereby a relatively hard damping action results.

In order to attain a softer damping action of the steering column, notwithstanding the presence of the pressure waves, the worm gear in accordance with the present invention is provided with a plurality of apertures which form throttle apertures for the damping medium disposed in the hollow space of the worm gear.

Such a construction enables an arrangement in which the countereffect of the pressure waves on the discharge of the pressure medium is considerably reduced as the direction of discharge of the pressure medium is not disposed exclusively coaxially to the steering column which produces these pressure waves but is disposed primarily perpendicularly thereto so that a continuous discharge or escape of the damping medium from the hollow spacing within the worm gear is possible. The individual bores are distributed over the entire length of the hollow space formed by the worm gear.

The effect of the yieldable steering column and therewith the protection of the driver against injuries is considerably improved if the distances between the bores which are disposed closer to the displacement or recuperator piston are smaller than the distances between the bores disposed at a greater distance therefrom.

As a result of such a construction, a softer damping action of the movement of the steering column is achieved during the commencement of the axial displacement of the steering column due to a more rapid escape or discharge of the damping medium from the hollow space of the worm gear into the steering gear housing while the damping action becomes increasingly and progressively more hard toward the end of the movement of the steering column.

A similar progressiveness of the damping action takes place if the distances between the bores increase uniformly with the distance from the displacement piston.

A further lessening or reduction of the initial shock can be effected by any suitable distribution of a part of the bores along the circumference of the hollow space of the worm gear in the immediate proximity of the displacement piston.

In order not to further reduce the already restricted space for the damping medium by the spring retaining the steering column and in order to achieve a safe securing of the steering column, the end of the steering column which is formed as displacement or recuperator piston is secured in accordance with the present invention by an overload stop-mechanism. The overload stop-mechanism consists of a springily split ring which, on the one hand, is disposed in a groove of the worm gear, and, on the other, lies in an annular recess of the displacement piston. By means of such a construction, it is possible that, notwithstanding the large number of throttle apertures in the worm gear, the damping medium is not subjected to any loads during normal operation thereof whereby the entire length of the damping space is available in case of collision. Simultaneuosly therewith, the feeling of safety of the driver is considerably increased by the rigid guidance of the steering column, which is rigidly guided in accordance with the present invention during normal operation thereof, as compared to known arrangements of steering columns which are retained by means of a resilient helical or coil spring.

By combining the features in accordance with the present invention, namely of the arrangement of the throttle apertures and of the provision of an overload stop-mechanism, it is possible to provide an extraordinarily effective damping arrangement for the steering column without requiring any essential changes of the other aggregates which are normally used in vehicles. This is particularly important for the subsequent installation of a safety arrangement in accordance with the present invention when such a safety arrangement is installed in vehicles which originally were not designed therefor.

The overload stop-mechanism in accordance with the present invention releases the steering column solely in the direction of a reduction of the length thereof. However, a pulling-out of the steering column out of the worm gear is impossible as the annularly-shaped recess in the displacement or recuperator piston is formed to one side thereof as an abutment arranged perpendicularly to the axis of the steering column.

Accordingly, it is an object of the present invention to provide a simple yet reliable damping arrangement for steering columns which increases the safety of the passenger or driver of the motor vehicle.

It is another object of the present invention to provide a damping arrangement for steering columns in motor vehicles which is so constructed as to be able to be readily installed in already existing steering arrangements without requiring any changes in the other aggregates or mechanisms of the vehicle.

Still another object of the present invention resides in the provision of such a damping arrangement for a steering column in which the steering column itself is formed as the displacement or recuperator piston for the hydraulic damping medium and in which an initially soft and thereafter progressively harder damping action is obtained.

A still further object of the present invention is the provision of an arrangement for damping mechanisms of steering columns in motor vehicles which minimizes the effect of backward shock or pressure waves which may result in case of collision and which might jeopardize ordinarily the operation of the damping device if the same is provided only with discharge apertures arranged in the axial direction thereof.

A further object of the present invention is the provision of an overload stop-mechanism for the steering column which is so constructed as to enable shortening of the steering column but which makes it impossible to pull out the steering column from the worm gear with which it is connected for common rotation, for example, by means of a well-known spline arrangement.

These and other objects, features, and advantages of the present invention will become more obvious from the following description when taken in connection with the accompanying drawing which shows, for purposes of illustration only, one preferred embodiment in accordance with the present invention and wherein:

Figure 1 is a cross-sectional view through the axis of a steering gear arrangement for motor vehicles provided with a damping device for the steering column in accordance with the present invention, Figure 2 is an enlarged cross-sectional view taken along line 2—2 of Figure 3, and Figure 3 is an enlarged cross-sectional view taken within the range of the overload stop-mechanism of Figure 1 to show more clearly the details thereof.

Referring now to the drawing wherein like reference numerals are used throughout the various views to designate like parts, and more particularly to Figure 1, reference numeral 1 designates the steering gear housing for the steering gear which consists additionally of a worm gear 4 suitably supported within the housing 1 by roller bearings 2 and 3 and of a toothed steering roller 5 which meshes with the worm gear 4. For purposes of lubrication, the steering gear housing 1 is filled with a lubricant, such as oil.

The worm gear 4 is provided with a concentric bore 6 into which extends the end of the steering column 7. For that purpose, the worm gear 4 is provided with a collar-like projection or extension 8 which is provided with an internal spline profile 9 by means of which the correspondingly shaped end of the steering column 7 is guided in the radial or rotational direction. The steering column 7 is provided with a sealing gasket 10 which may be made of any suitable gasket material. The bore 6 in the worm gear 4 is closed by a cap-like member 11. The hollow space 12 formed thereby within the worm gear 4 is in communication with the steering gear housing over bores 13 which are arranged in the worm gear 4 and are distributed over the entire length of the bore 6 so that lubricating oil may flow into and out of the hollow space 12. The bores 13 are distributed over the length of the bore 6 axially of the gear 4 in such a manner that the distance a between the individual bores 13 increases uniformly with an increase in the distance from the steering column 7. In addition thereto, the cap-like member 11 is provided with a bore 14.

The end of the steering column 7 which extends into the worm gear 4 is secured by means of an overload stop-mechanism which consists of a split ring 15 which, on the one hand, is retained in a groove 16 of the extension 8 of the worm gear 4, and, on the other, springly surrounds the steering column 7 in an annular recess 17. The ring 15 is so dimensioned that with an axial load thereon of, for example, 70 kg., the steering column 7 is released which thereupon acts on the oil within the hollow space 12 by means of the displacement or recuperator piston formed by the left end of the steering column, as viewed in Figure 1.

By reason of the relatively short distances a between the bores 13 which are closest to the displacement or recuperator piston of the steering column 7, a larger quantity of oil is initially displaced into the steering gear housing 1 so that the initial shock is absorbed in a relatively soft manner. Simultaneously therewith, the pressure waves which are produced by this initial shock can only have a slight effect on the axial displacement of the steering column 7 as the yieldability of the damping medium or oil is considerably increased by the bores as compared to known prior art arrangements. This yieldability, however, is more and more reduced toward the end of the axial displacement of the steering column 7 by the ever increasing distances between the bores so that a progressive damping action of the shock and of the movement of the steering column 7 takes place. In order to absorb more favorably the initial load, additional bores 18 may be provided in accordance with the present invention in the immediate proximity of the displacement or recuperator piston formed by the steering column 7 which are arranged along the circumference of the bore 6.

In order to prevent an accidental removal or pulling out of the steering column 7 from the collar-like extension 8 of the worm gear 4, the stop-mechanism in accordance with the present invention is so constructed that it releases the steering column 7 exclusively upon application of pressure thereon in a downward direction as is the case with collisions when excessive loads occur, yet retains securely the steering column 7 against movement in the opposite direction. For that purpose, the annular recess 17 (Figure 3) provided in the steering column 7 has an inclined wedging surface 19 by means of which the split ring 15 upon displacement of the steering column 7 toward the left is deformed or expanded and thereby releases the steering column 7. A displacement of the steering column 7 toward the right, as viewed in Figure 3, is not possible as the annularly shaped recess 17 is provided with a surface 20 which is perpendicular to the axis of the steering column 7 and is effective as an abutment which does not permit expansion or spreading of the ring 15.

While I have shown and described one preferred embodiment in accordance with the present invention, it is understood that the same is not limited thereto but is susceptible of many changes and modifications within the spirit of the invention, and I intend to cover all such changes and modifications except as defined by the appended claims.

I claim:

1. An axially yieldable steering column assembly for motor vehicles comprising a steering column, a hollow worm gear for guiding therein said steering column, said steering column being axially movable relative to said hollow worm gear but connected thereto for common rotation therewith, the space within said hollow worm gear forming a space for a hydraulic damping medium, the end of said steering column extending into said space forming a displacement piston, means normally preventing axial movement of said steering column relative to said worm gear but enabling such axial movement in case of collision, means in said worm gear including a plurality of bores distributed axially of the gear and forming throttle apertures for said damping medium within said space to minimize the effect of reflected pressure waves caused by the shock of the collison and tending upon displacement of said column, to progressively lessen the discharge of said medium from said hollow space, said first mentioned means including an overload stop mechanism for releasably securing said column against axial displacement in one direction and barring at all times axial displacement of the column from its normal position in the opposite direction, said first direction being the direction in which the steering column is forced by the driver of the vehicle upon an abrupt stop due to collision, said stop mechanism releasing said column for displacement in said one direction only upon the application of a predetermined excessive axial load on said column in said one direction.

2. A steering column assembly according to claim 1, wherein said stop mechanism comprises a groove in the worm gear, a recess in said colmn and a split spring ring encircling said column and lying in both said groove and said recess, the wall of one side of said recess forming an abutment surface disposed to engage said ring and prevent displacement of the column in said opposite direction relative to the worm gear, the wall at the opposite side of said recess forming a wedging surface for deforming said ring to release the steering column for movement in said first direction upon obtainment of the predetermined excessive axial load.

References Cited in the file of this patent

UNITED STATES PATENTS

| | | |
|---|---|---|
| 858,131 | Aichele | June 25, 1907 |
| 1,295,065 | Riley et al. | Feb. 18, 1919 |
| 1,650,573 | Searles | Nov. 22, 1927 |
| 1,847,721 | Marles | Mar. 1, 1932 |
| 2,273,772 | Pollitz | Feb. 17, 1942 |
| 2,549,345 | Tamboli | Apr. 17, 1951 |
| 2,650,843 | Spurgeon | Sept. 1, 1953 |
| 2,716,355 | Schmid | Aug. 30, 1955 |
| 2,803,970 | Sacks | Aug. 27, 1957 |